Feb. 24, 1953 J. W. GIFFEN ET AL 2,629,206
GLASS SEVERING
Filed Aug. 1, 1949
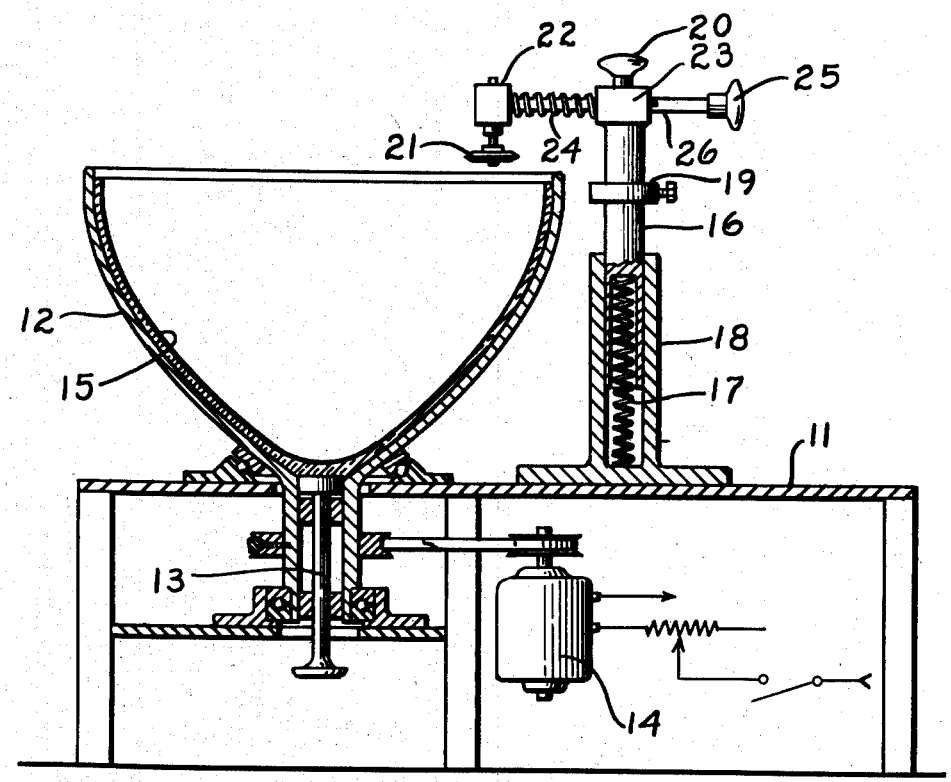
INVENTORS
JAMES W. GIFFEN
AND JAY C. OVERMYER
BY
R. E. Schneider
ATTORNEY Patented Feb. 24, 1953

2,629,206

UNITED STATES PATENT OFFICE 2,629,206

GLASS SEVERING

James W. Giffen, Corning, and Jay C. Overmyer, Painted Post, N. Y., assignors to Corning Glass Works, Corning, N. Y., a corporation of New York Application August 1, 1949, Serial No. 107,946

6 Claims. (Cl. 49—79)

The present invention relates to glass severing and is particularly directed to the severance of excess or undesired glass from a glass article following its formation.

The primary object of the invention is the provision of such a glass-severing method which takes advantage of the workable condition of glass immediately following formation of a hollow article from a charge of molten glass.

A further object of the invention is to effect initiation of the severance of the excess glass from the hollow glass article immediately after its formation from a parent supply body of molten glass.

A still further object is to effect such initiation of the severance of the excess glass from the hollow glass article prior to its removal from its forming mold.

Still another object is to accomplish the ultimate severance of the excess glass through thermal shear, i. e., through mechanical shear induced or introduced by a thermal gradient.

In order to attain a clear understanding of applicant's method, reference is made to the accompanying figure of drawing depicting a sectional side elevation of a mold, a formed glass bowl arranged within the mold, and associated apparatus suitable for centrifugally forming a charge of molten glass deposited in the mold into the illustrated bowl. The figure also shows in elevation, and partly in section, associated apparatus suitable for forming a groove in the bowl before the glass has become set in order to initiate severance of excess glass therefrom.

Referring to the drawing in detail, the numeral 11 designates a housing having an associated mold 12, equipped, if desired, with a conventional knock-out valve 13 and adapted to be rotated by a motor 14 to centrifugally form the bowl 15 from a suitable gob of molten glass deposited therein.

The associated apparatus for initiating the severance of excess or undesired glass from the bowl is illustrated as comprising a grooving assembly having a depending post 16 resiliently supported upon a spring 17 in a bearing 18 carried on housing 11. Post 16 at its top end is formed into a knob 20 which may be engaged to compress spring 17 to bring a grooving disc 21 into mold 12 at the level at which the excess glass is to be trimmed from the bowl 15. Adjustable collar 19 may be provided on post 16 to engage bearing 18 and thereby to control the extent to which the grooving disc can be lowered into the mold. Disc 21 is rotatably supported in a suitable bearing 22 on one end of a rod 26 which is slidable in a horizontal bearing 23 formed integral with post 16. A spring 24, arranged on rod 26 between bearings 22 and 23, holds the disc 21 in a position in which it can readily be lowered into mold 12 without engaging its wall or the formed bowl therein, and can then be brought into grooving relation with the bowl wall by pulling on a handle 25 provided on the opposite end of rod 26.

In carrying out applicant's method, immediately following formation of bowl 15 in mold 12, and before the glass has fully set and while the mold is still rotating, knob 20 is depressed to bring disc 21 to the level in mold 12 at which the groove in bowl 15 is to be formed. An outward pull is then exerted on handle 25, thus bringing the disc 21 into grooving relation with the wall of the bowl to form an annular groove therein as the bowl is rotated. After the groove has been formed the grooving assembly may be permitted to return to its initial position under the influence of springs 24 and 17. Post 16 may subsequently be rotated in the bearing 18 to bring parts 21, 22, 24, and 26 clear of the mold 12 to enable ready removal of the bowl 15 therefrom. The bowl may then be removed by a conventional vacuum take-out mechanism, or it may be made available for manual or mechanical seizure and removal by elevation within the mold by means of the valve 13.

Thereupon the bowl is passed through an annealing lehr wherein the excess glass is separated therefrom by thermal shear substantially along the line of the groove. The bowl is preferably placed in an inverted position on the lehr belt; and as it passes through the lehr, dropping of the temperature of the ring of excess glass is retarded by the transmission of heat thereto primarily by conduction from the lehr belt, so that shrinkage of the bowl somewhat precedes shrinkage of the ring of excess glass. As a consequence, a thermal gradient is set up between the ring of excess glass and the bowl; and thermal shear is effected along the grooved line whereby the excess glass is severed from the bowl proper.

Generally, the grooving assembly should be so operated that the depth of the groove formed is between about one-half and about two-thirds the bowl wall thickness. With a groove of less depth, a clean severance of the ring of excess glass may not be accomplished, or no severance at all may take place if the depth of the groove is too slight. On the other hand, actuation of the grooving assembly to effect complete severance within the mold is to be avoided, not only because of the difficulty in removing the severed ring of excess glass or the parts thereof, but also because of possible damage to the mold by contact of the grooving disc therewith.

Alternatively, the grooving assembly may be so actuated that the depth of the groove is increased to slightly more than about two-thirds of the wall thickness. In such case, the ring of excess glass, being of such small volume compared to that of the bowl proper, and being so nearly separated therefrom, chills much more rapidly than the bowl and, almost immediately after removal of the formed bowl from the mold, shrinks sufficiently to effect its severance from the bowl proper by thermal shear along the groove.

We claim:

1. The method of producing a hollow glass article in a mold having an internal configuration corresponding to the outer configuration of the article to be formed, which includes forming the article from a charge of molten glass deposited in such mold solely by rotating the mold to centrifugally distribute molten glass over the walls thereof, thereafter engaging the inner surface of the formed article with a grooving member before the glass has become set and applying pressure thereto to form a groove therein along a desired line of severance as rotation of the mold and article is continued, and thereafter extracting heat at different rates from the portions of such article on opposite sides of the groove to thereby establish a temperature gradient between the opposite sides of the groove to effect its severance along such groove.

2. The method of producing a hollow glass article in a vertically arranged open-ended mold with its open end uppermost, which includes rotating the mold to centrifugally spread molten glass deposited therein laterally and vertically upward over the walls thereof to form the desired article, engaging the inner surface of the formed article near its upper end with a grooving member after movement of glass under centrifugal action has ceased but while the glass is still workable and applying pressure thereto to form a groove therein along a desired line of severance as rotation of the mold and article is continued, and thereafter extracting heat at different rates from the portions of such article on opposite sides of the groove to thereby establish a temperature gradient between the opposite sides of the groove to effect its severance along such line.

3. The method of producing a hollow glass article from a charge of molten glass deposited in a mold having an internal configuration corresponding to the outer configuration of the article to be formed, which includes forming the article from such charge solely by rotating the mold to centrifugally distribute molten glass over the walls thereof, thereafter engaging the inner surface of the formed article with a grooving member before the glass has become set and applying pressure thereto to form a groove therein along a desired line of severance while effecting relative movement between the article and the grooving member, and thereafter extracting heat at different rates from the portions of such article on opposite sides of the groove to thereby establish a temperature gradient between the opposite sides of the groove to effect its severance along such groove.

4. The method as claimed in claim 2, wherein the groove is formed on the inner surface of the article to a depth equal to at least one-half of the article wall thickness.

5. A method which comprises forming a hollow glass article from a molten body thereof, grooving the article along a desired line of separation while the glass is still workable, and thereafter extracting heat at different rates from the portions of such article on opposite sides of the groove to thereby establish a sufficient temperature gradient between the opposite sides of such groove to effect severance of the article along such groove.

6. A method of glass article formation which includes rotation of a mold therefor during formation of an article therein, grooving a surface of revolution of the article along a desired line of separation before rotation of the mold is discontinued and before the glass therein becomes set, and thereafter extracting heat at different rates from the portions of such article on opposite sides of the groove to thereby establish a sufficient temperature gradient between the opposite sides of such groove to effect its separation along such groove.

JAMES W. GIFFEN.
JAY C. OVERMYER.

REFERENCES CITED

The following references are of record in the file of this patent:

UNITED STATES PATENTS

| Number | Name | Date |
|---|---|---|
| 2,349,046 | Luertzing | May 16, 1944 |

FOREIGN PATENTS

| Number | Country | Date |
|---|---|---|
| 256,767 | Germany | Feb. 19, 1913 |